United States Patent [19]

Dormehl

[11] 4,200,014
[45] Apr. 29, 1980

[54] WORKPIECE CHANGING MECHANISMS FOR LATHES

[75] Inventor: Erich Dormehl, Giessen, Fed. Rep. of Germany

[73] Assignee: Heyligenstaedt & Comp., Werkzeugmaschinenfabrik GmbH, Giessen, Fed. Rep. of Germany

[21] Appl. No.: 922,173

[22] Filed: Jul. 5, 1978

[30] Foreign Application Priority Data

Jul. 29, 1977 [DE] Fed. Rep. of Germany ....... 2734228

[51] Int. Cl.² .............................................. B23B 13/00
[52] U.S. Cl. ................................................... 82/2.7
[58] Field of Search .......................................... 82/2.7

[56] References Cited

U.S. PATENT DOCUMENTS

| | | | |
|---|---|---|---|
| 2,714,324 | 8/1955 | Dinsmore et al. | 82/2.7 |
| 3,182,533 | 5/1965 | Gramspacher et al. | 82/2.7 |
| 3,844,186 | 9/1974 | Youden et al. | 82/2 R |
| 4,061,062 | 12/1977 | Peltier | 82/2.7 |

Primary Examiner—Harrison L. Hinson
Attorney, Agent, or Firm—Schwartz & Weinrieb

[57] ABSTRACT

A workpiece changing mechanism for a numerically controlled lathe having a work spindle, a turnings guard and a turret in which a tool centering recess is provided and which is arranged to be moved in a direction essentially parallel to the axis of the work spindle. The workpiece changing mechanism comprises a first workpiece transfer device, a second workpiece transfer device and a workpiece gripper. The workpiece gripper is located, and preferably fixed, in the centering recess in the turret and is operable to transfer workpieces from the first workpiece transfer device to a work fixture of the lathe and from the work fixture to the second workpiece transfer device, and the first and second workpiece transfer devices are movably mounted within the turnings guard on the operating side of the lathe.

6 Claims, 1 Drawing Figure

U.S. Patent   Apr. 29, 1980   4,200,014
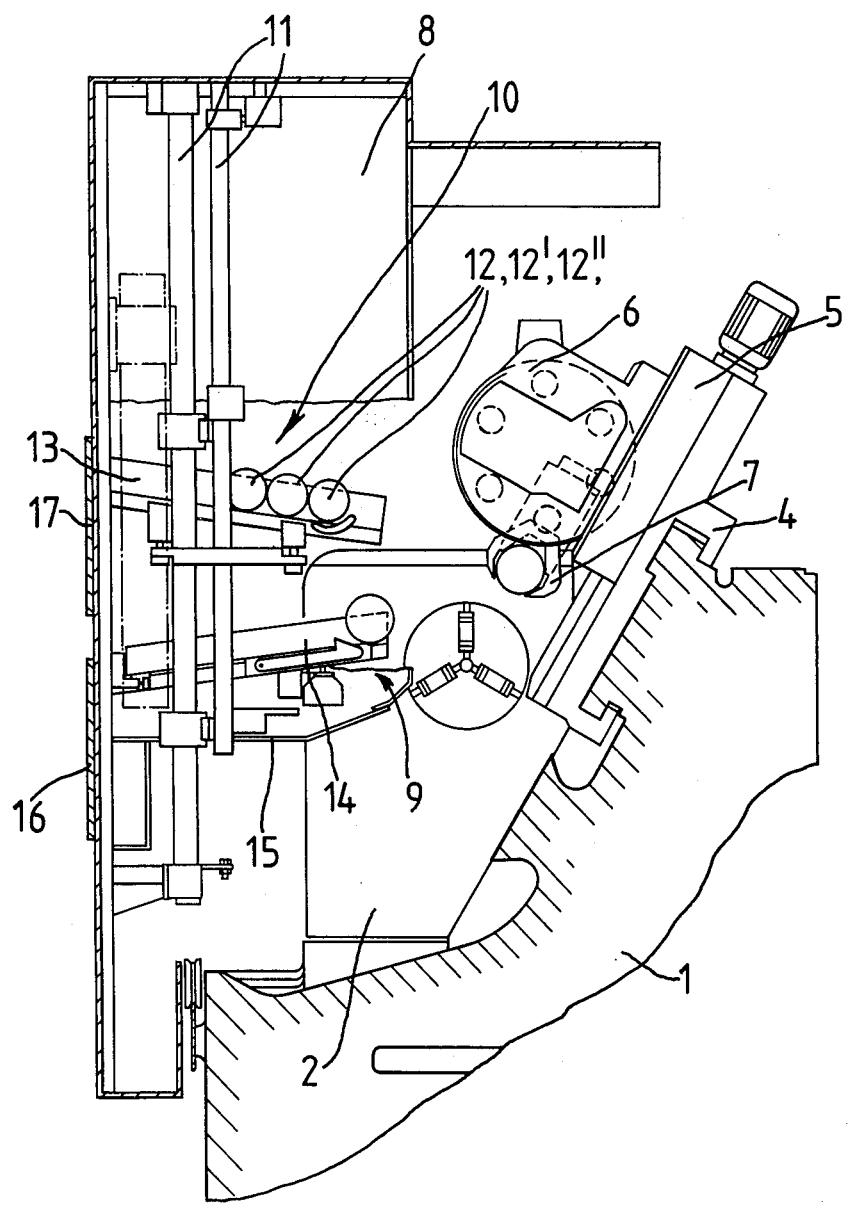

4,200,014

WORKPIECE CHANGING MECHANISMS FOR LATHES

BACKGROUND OF THE INVENTION

This invention relates to a workpiece changing mechanism for a numerically controlled lathe in which a workpiece gripper for transferring workpieces from a workpiece transfer station to the work fixture of the lathe is provided in a tool centering recess of a turret of the lathe.

A workpiece changing mechanism of this type is known from German Auslegeschrift No. 1,148,840 in which the rotational axis of the turret is at an angle of 90° to the rotational axis of the spindle. The workpiece gripper is located in a radial tool centering recess of the turret. Therefore, the workpieces are transferred by the workpiece gripper by a 180° rotation of the turret in the longitudinal direction of the lathe. Although this makes it possible to locate the workpiece transfer station well beyond the turnings area without long travels of the saddle being necessary for changing the workpiece, considerable time is required for the 180° rotation of the turret. Moreover, this arrangement only makes it possible to load or transfer short shafts or chucks of small size.

In modern lathes, the turret is generally axially parallel to the spindle, so that a maximum number of tools can be set in the turret through axial tool centering recesses.

If it were desired to equip such a lathe with a workpiece changing mechanism in which a workpiece gripper had to be fitted in the turret, the workpiece would not be conveyed out of the turnings area by a rotation of the turret. Therefore, the saddle would have to be moved to a workpiece transfer station located outside the turnings area, which would once again take too much time.

Hitherto, the arrangement of the workpiece transfer station between the turnings guard and the movement path of the turret in order to reduce the necessary time has not been considered because in this area the space conditions are very unfavourable and the transfer of the workpiece would have to take place at the point accessible to turnings during the machining process. It must also be ensured that the workpiece transfer station and the associated devices for supplying and removing the workpieces must not impede the visibility of the lathe operator.

BRIEF SUMMARY OF THE INVENTION

The object of the present invention is to provide a workpiece changing mechanism of the type indicated above for a lathe with a turret arranged axially parallel to the spindle, in which the workpiece change takes place as rapidly as possible and whose operation is not impeded by turnings.

According to the invention, this problem is solved by providing a numerically controlled lathe having a work spindle, a turnings guard and a turret, in which a tool centering recess is provided and which is arranged to be moved in a direction essentially parallel to the axis of said spindle, with a workpiece changing mechanism comprising a first workpiece transfer device, a second workpiece transfer device and a workpiece gripper; said workpiece gripper being located in said centering recess in the turret and being operable to transfer workpieces from said first transfer device to a work fixture of the lathe and from said work fixture to said second transfer device, and said first and second workpiece transfer devices being movably mounted within the turnings guard on the operating side of the lathe.

The particular advantages of the mechanism according to the invention are that the workpiece transfer devices can be moved out of the turnings zone during the machining process, but can be moved into the vicinity of the workpiece gripper for changing the workpieces. Thus, the turret and workpiece gripper only have to travel short distances, so that a workpiece change takes only a short time. Owing to the fact that the workpiece transfer devices can be moved out of the turnings area during the machining process, operations are not impeded by turnings. In addition, due to this mobility, the workpiece transfer devices with their workpiece supply and removal devices scarcely impede visibility of the lathe during the machining process. From a safety standpoint, it is advantageous that the workpiece change can take place with the turnings guard closed owing to the compact construction of the workpiece changing mechanism, so that there is no possibility of the operator being injured by touching moving machine parts. The time for opening and closing the turnings guard is also saved. It is also advantageous for the ergonomy of the lathe that for setting up the lathe the workpiece transfer devices can be moved upwards.

According to an advantageous development of the invention, the workpiece gripper is fixed in the turret and is constructed merely to perform a closing or opening movement. This simple construction of the workpiece gripper is possible because the workpiece transfer stations can be adjusted in height. Thus, workpiece transfer can always take place at the same point, so that the transfer angle is always the same and there is no need to pivot the head of the workpiece gripper. As opposed to the construction described relative to DAS No. 1,148,840, due to the simple construction of the workpiece gripper according to the invention, the latter can be made so short and compact that the turret is freely rotatable in the working area of the machine tool without any possibility of collision.

According to a further development of the invention, the two workpiece transfer stations are superimposed, so that only the cross-slide has to be moved and only the turret has to be rotated for changing the crosspiece, which further reduces the stoppage times for changing the workpiece.

BRIEF DESCRIPTION OF THE DRAWING

The invention is described in greater detail, by way of example, with reference to the drawing which shows a cross-section through a lathe with one embodiment of a workpiece changing mechanism according to the invention.

DESCRIPTION OF PREFERRED EMBODIMENT

Referring to the drawing, a headstock 2 of a lathe is arranged in conventional manner on a machine bed 1. On the machine bed 1 is guided a longitudinal support 4 which carries a cross-slide 5 with a turret 6, which serves to receive various tools (not shown) and a workpiece gripper 7. Like the tools, the workpiece gripper 7 is fixed in the turret 6. It is able to open and close by means of an actuating mechanism which is not shown in the drawing.

Two workpiece transfer devices 9 and 10 are arranged between the cross-slide 5 and a turnings guard 8, said devices being raisable by means of a lifting mechanism 11. The upper workpiece transfer device 10 serves to supply workpieces 12, 12', 12" and substantially comprises a ramp 13 inclined towards the inside of the lathe. The lower workpiece transfer device 9 is used for conveying away the workpieces and has a ramp 14 inclined away from the lathe. A metal plate 15 is positioned below the workpiece transfer device 9 and protects the bottom of the complete workpiece changing mechanism relative to the turnings area. Two flaps 17 and 16 are provided in the turnings guard for supplying and removing respectively the workpieces, said flaps being respectively aligned with the workpiece transfer devices 10 and 9 in the lowermost position of the latter.

The workpiece changing mechanism functions in the following manner.

Following the final operation, the turret 6 is pivoted in such a way that the workpiece gripper 7 is directed at the workpiece. The cross-slide 5 then moves downwards until the workpiece gripper 7 grips and secures the workpiece and is able to move with the latter out of the work fixture. The cross-slide 5, together with the workpiece then moves slightly upwards. The turret 6 is then rotated through 60° and the cross-slide 5 moves down again.

During the above movement sequence, the workpiece transfer devices 9 and 10 are moved downwards into the position shown in the drawing. Therefore, the workpiece gripper 7 can place the workpiece on the ramp 14.

The cross-slide 5 now returns and the workpiece transfer devices 9 and 10 move downwards until the device 10 is precisely at the original height of device 9. By moving cross-slide 5, the workpiece gripper 7 can now grip the workpiece, and in an identical manner to the depositing of a workpiece can supply the latter to the lathe chuck.

The invention is not limited to the embodiment described and represented above and various modifications can be made thereto without departing from the spirit and scope of the invention as defined by the appended claims.

I claim:

1. In a numerically controlled lathe having a work spindle, a turnings guard, and a tool-carrying turret in which a tool centering recess is provided and which is arranged to be moved in a direction essentially parallel to the axis of said spindle, a workpiece changing mechanism comprising:

first workpiece transfer means for conveying workpieces-to-be-machined to an area defined within the vicinity of said work spindle;

second workpiece transfer means for conveying machined workpieces away from said vicinity area of said work spindle; and workpiece gripping means mounted within said centering recess of said tool-carrying turret for transferring said workpieces-to-be-machined from said first transfer means to a work fixture of said lathe and for transferring said machined workpieces from said work fixture of said lathe to said second transfer means, said first and second workpiece transfer means being movably mounted within said turnings guard on the operating side of said lathe and relative to said vicinity area of said work spindle so as to operatively cooperate with said workpiece gripping means in a cyclical manner.

2. A workpiece changing mechanism as claimed in claim 1, in which said workpiece gripper is fixed in the turret and is so constructed that it performs only an opening or a closing movement.

3. A workpiece changing mechanism as claimed in claim 1, in which said first and second workpiece transfer devices are superimposed.

4. A workpiece changing mechanism as set forth in claim 1, wherein:

said first and second transfer means are reciprocably movable within a vertical plane.

5. A workpiece changing mechanism as set forth in claim 4, wherein:

said first and second transfer means are selectively movable into and out of said vicinity area of said work spindle such that only one of said first and second transfer means is disposed within said vicinity area of said work spindle during one of said transfer operations of said workpiece machining cycle.

6. A workpiece changing mechanism as set forth in claim 1, wherein:

said first and second transfer means each comprises an inclined conveyor ramp, said first transfer ramp being inclined downwardly toward said vicinity area of said work spindle, and said second transfer ramp being inclined downwardly away from said vicinity area of said work spindle.

* * * * *